Nov. 10, 1959 W. P. EWALD 2,911,682
METHOD OF CASTING A MULTIREFLECTOR PRISM IN A FLEXIBLE MOLD
Filed Feb. 28, 1955 2 Sheets-Sheet 1

TO VACUUM PUMP

William P. Ewald
INVENTOR.
BY
ATTORNEYS

Nov. 10, 1959 W. P. EWALD 2,911,682
METHOD OF CASTING A MULTIREFLECTOR PRISM IN A FLEXIBLE MOLD
Filed Feb. 28, 1955 2 Sheets-Sheet 2

William P. Ewald
INVENTOR.
ATTORNEYS

United States Patent Office 2,911,682
Patented Nov. 10, 1959

2,911,682

METHOD OF CASTING A MULTIREFLECTOR PRISM IN A FLEXIBLE MOLD

William P. Ewald, Rochester, N.Y., assignor to Eastman Kodak Company, Rochester, N.Y., a corporation of New Jersey Application February 28, 1955, Serial No. 491,014

4 Claims. (Cl. 18—58)

This invention relates to multireflectors such as roof prisms, Porro prisms, and other internal reflecting prisms.

Precise multireflector prisms are quite expensive to manufacture. The object of the present invention is to provide the equivalent of a precise prism at a much lower cost. In the past, efforts have been made to substitute two or more front surface mirrors for the internal reflecting surfaces of a multireflector prism, but this has required precision of mounting of the mirrors and has usually also required precision adjustment of the mount. The net result has been a multireflector which is quite expensive and which may even cost more than the simple prism it is intended to replace. The present invention does employ front surface reflecting surfaces but they are not separately mounted mirrors.

The reflecting surface according to the invention is supported by a rigid plastic. The instability and lack of rigidity of most plastics renders them unsatisfactory for this purpose. Therefore, the present invention is restricted to the use of rigid polymerized plastics as distinguished from thermoplastics and the like. However, even polymerized plastics tend to shrink on polymerization. Accordingly, a particular object of the present invention is to eliminate the effects of shrinkage of the plastic during polymerization.

Since the reflecting surfaces ultimately obtained by the present invention are internal surfaces of a cup-shaped member or a member corresponding to at least part of a plastic cup, it is difficult to apply a front surface reflecting coating to the internal surfaces of the member. Thus an object of a preferred embodiment of the invention is to provide such front surface reflecting coatings on these surfaces which are difficult of access.

According to the invention a multireflector corresponding to a precise rigid prism is manufactured by coating the prism itself first with a thin separable layer. For example, the prism may be a glass prism of the type which the present invention is to imitate, but with a suitable handle since it is to be used as part of a mold, or it may be a metal prism ground and polished to be the full equivalent of such a glass prism.

After the separable layer, for example, a layer of silver metal is applied to the prism, the coated prism is held inside a flexible mold which in general is spaced from the surfaces corresponding to the reflecting surfaces of the multireflector but which may touch the prism at other points. That is, the surfaces of the prism corresponding to reflecting surfaces, are held at a substantially uniform distance between .05 and .5 inch from the flexible mold. The space between the prism and the flexible mold is then filled with a liquid potting compound of the type which polymerizes to a rigid plastic and after polymerization, the prism is removed from this rigid plastic.

Usually the flexible mold is also removed from the rigid plastic, but if inexpensive flexible molds are used, these may remain with the rigid plastic.

In any case the shrinkage of the plastic during polymerization does not cause the surface of this plastic which is in contact with the prism to change by a measurable amount since the flexible mold moves with the shrinking plastic and all of the shrinkage is taken up on the outer surfaces of the plastic. The quality of the results is astonishing. The important surfaces, i.e. the inner reflecting surfaces, maintain their optical quality within a few wavelengths of light in spite of the fact that the outer surfaces of the plastic appear warped and distorted. Furthermore, this optical quality is maintained in spite of considerable rough handling of the finished product. In practice the optical quality continues indefinitely in spite of dropping the optical unit and in spite of any damage short of actual breaking of the unit. The mold may be shaped to provide reinforcing struts of rigid plastic between the reflecting surfaces, but in practice even a minimum amount of connecting plastic has been found quite adequate.

The separable layer may stay entirely on the prism and not affect the finished product. If any of the separable layer adheres to the inner surfaces of the rigid plastic multireflector, this separable layer may be removed, for example, by a suitable solvent.

The application of aluminum reflecting layers with magnesium fluoride or silicon monoxide overcoating for protection purposes, by means of vacuum evaporation or sublimation is well known. However, it would be quite difficult to obtain a uniform coating on the inside surfaces of a molded plastic member of the type described above. Accordingly, according to a preferred embodiment of the invention the precise prism is first coated with the separable layer as discussed above and is then vacuum coated with magnesium fluoride, or silicon monoxide, followed by aluminum, the later coating being thick enough to be highly reflecting, say over 90% reflecting. The multicoated prism is then used as part of a mold, as described above, the other part being the flexible cup. After the prism is removed from the rigid plastic, in this case, the aluminum and the magnesium fluoride or silicon monoxide coatings adhere to the rigid plastic and constitute the uniform front surface reflecting layers as required. If some of the separation or separable layer such as silver adheres to the magnesium fluoride or silicon monoxide, it is quickly removed by an acid rinse.

The most preferred resins to use as the potting compound are the polyamide resins, preferably mixed with epoxide resins, or with epoxide-urea formaldehyde resins, since these combinations have small shrinkage. The present invention insures that the residual small shrinkage is unidirectional toward the optical surface and hence harmless. These resins are not usually transparent but this does not affect the present invention which is concerned only with front surface reflection, but is particularly concerned with holding this front surface optically flat. This requires both the low shrinkage resin and the flexible outer mold features.

Epoxide resins are a known class of condensation polymers, having the typical structure:

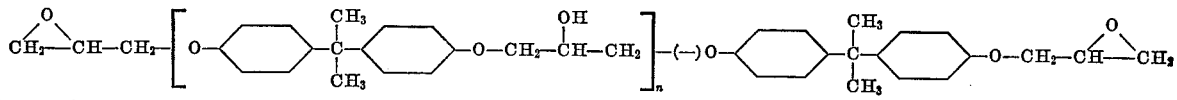

Polyamide resins are similarly well known and have the typical structure:

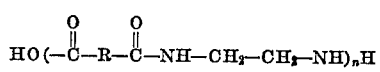

where R is an alkyl group and $n$ has a value between 5 and 15. Techniques for the blending of polyamide resins and epoxy resin are known.

The invention will be more fully understood from the following description when read in connection with the accompanying drawings in which.

Figs. 5 to 8, inclusive, are perspective drawings of multireflectors according to different embodiments of the present invention; and Figs. 9 to 12, inclusive, are greatly enlarged cross sections of the reflecting surface of the present invention at various stages of manufacture.

The drawings all illustrate the application of the present invention to a roof prism, but it will be understood that the invention is equally applicable and useful with any multireflector (non-refracting).

Figure 1:
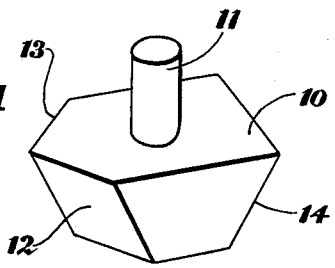
Fig. 1 illustrates part of a mold comprising a precise prism.

In Fig. 1 a precise prism 10 is provided with a suitable handle 11. The prism 10 may be made of glass in which case the surfaces 12, 13 and 14 constitute the essential optical surfaces at which light is internally reflected. The top surface of such a prism acts merely as an entrance and exit surface, but in the present case does not have to be of optical quality since the quality of this upper surface has no effect on the multireflectors made according to the present invention. Alternatively the prism 10 may be made of metal with the surfaces 12, 13 and 14 highly polished to correspond to the internal reflecting surfaces of such a glass prism. Before the prism 10 is used as one part of a mold, all of the surfaces of the prism 10, including the optical quality surfaces 12, 13 and 14, which are to come in contact with the plastic to be molded or potting compound, are provided with a separable or separation layer such as a layer of silver and usually with additional layers as discussed below.

Figure 2:
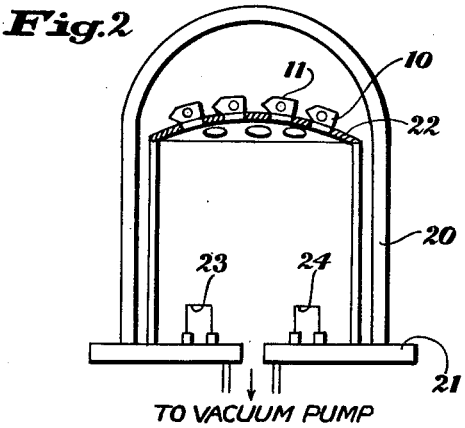
Fig. 2 illustrates schematically a step of vacuum coating a surface of such a prism.

The separation layer and the additional layers may be provided by vacuum coating in the well known way as illustrated in Fig. 2 in which a bell jar 20 on a suitable base plate 21 is evacuated by vacuum pumps not shown. Prisms to be coated such as shown at 10 are supported on a spherical support 22 with the surface to be coated face downward through openings in the support. The material 23 or 24 to be coated on the surface is evaporated from electrically heated crucibles in the well known way as shown. The method illustrated allows the successive layers to be coated on the prisms without breaking the vacuum merely by turning on the electric currents to the crucibles containing materials 23 and 24 in the order desired. All of this is well known. The arrangement shown in Fig. 2 permits only one surface of each prism 10 to be coated at a time which is quite a practical way to do it, but it is also well known that more elaborate coating chambers can be arranged to coat two or more surfaces at the same time.

Figure 3:
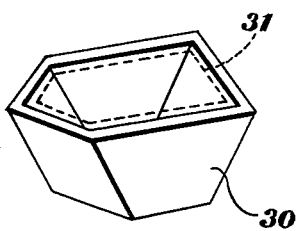
Fig. 3 shows in perspective the other part of the mold.

In Fig. 3 a flexible cup-shaped mold 30 matches the prism 10 of Fig. 1 and the internal dimensions of the mold 30 are about ⅛ inch larger than the outside dimensions of the prism 10. The position of the prism 10 during the potting operation is shown by dotted lines 31 in Fig. 3. The potting compound is a polymerizable liquid such as an epoxy resin. This potting compound is poured into the space between the prism 10 in position 31 and the flexible mold 30. The important feature of the flexibility of the mold 30 is the fact that it permits unidirectional shrinkage of the potting compound during polymerization; that is, the potting compound never shrinks away from the surface of the prism 10. It always remains in contact with the prism and the flexible mold 30 follows the shrinking plastic so that all of the shrinkage is represented by the distorted outer surface of the molding plastic.

Figure 5:
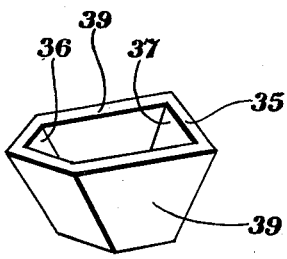
Figure 6:
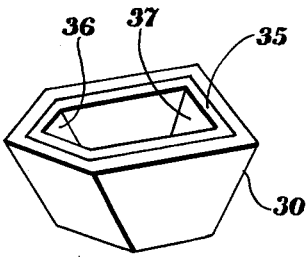

It is realized that the flexible mold permits easy removal of the mold from the polymerized plastic, but this is not an essential feature of the present invention. In certain embodiments of the present invention as shown in Fig. 5 the flexible mold is removed leaving a multireflector 35 consisting entirely of the polymerized resin together with any coatings which may have remained on its inner surfaces by transfer from the prism 10. Alternatively, the plastic mold 30 may stay with the resin 35 as shown in Fig. 6.

In both of these cases the surfaces 36 and 37, for example, maintain their high optical quality and the resulting unit constitutes an excellent multireflector.

Figure 4:
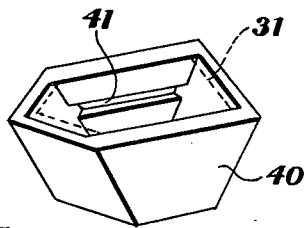
Fig. 4 shows an alternative form of this second part of the mold.
Figure 7:
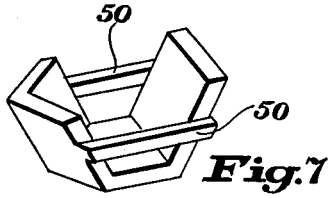

It has been found, however, that the side walls 39 are not necessary and may be eliminated providing there is some minimum amount of support between the walls of the unit which carry the essential surfaces 36, 37, etc. An alternative arrangement is shown in Fig. 4 wherein the prism 10 again shown by dotted lines 31 touches the two side walls of the flexible mold 40 in this case. The potting compound poured between the prism and the flexible mold results in a unit as shown in Fig. 7 if channels 41 are left in the side walls of the flexible mold 40 to provide the struts 50 or the resulting unit appears as shown in Fig. 8 if these channels 41 are omitted.

Figure 8:
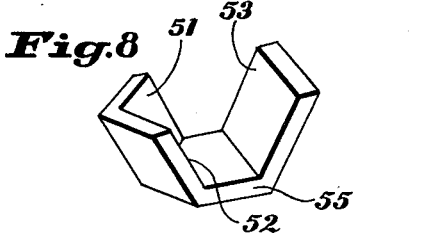
Figure 9:
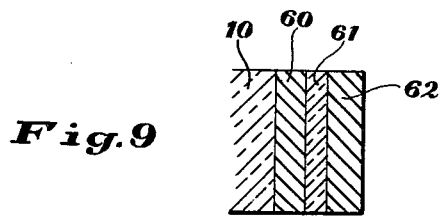

The struts 50 do provide additional support, but even the simple unit shown in Fig. 8 has been found to have and to maintain apparent optical quality as a multireflector. The surfaces 51, 52 and 53 have the highest optical quality and the orientation and position of the surfaces with respect to each other is accurately maintained even though the only connecting support is the lower wall or floor 55 consisting of the polymerized epoxy resin itself.

Reference to Figs. 5, 6, 7 or 8 will show quickly that it would be difficult to apply a front surface reflecting layer to the optical surfaces of these units after the units are made up. Accordingly, the desired reflecting layer or layers are applied to the prism 10 before the molding operation and transferred to the polymerized resin during the molding. This is illustrated in Figs. 9 to 12. The glass prism 10 is first coated with a silver layer 60 which is then overcoated with a silicon monoxide layer 61 or other protective layer which in turn is finally coated with a relatively thick layer 62 of aluminum. This layer should be thick enough to be highly reflecting. The three layers 60, 61 and 62 are applied by vacuum coating as illustrated in Fig. 2.

Figure 10:
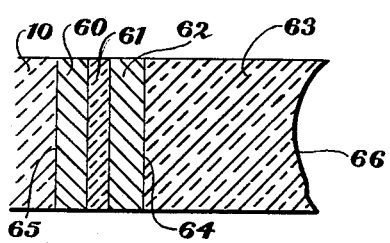

As shown in Fig. 10 the coated prisms receive the polymerizable epoxy resin 63 which becomes a rigid solid, the surface 64 in contact with the aluminum 62 being of high optical quality and having, for all practical purposes, the optical quality of the surface 65 of the prism 10. The back surface 66 of the resin 63 is warped and all of the distortion due to shrinkage occurs at this surface without distorting the front surface of the member.

Figure 11:
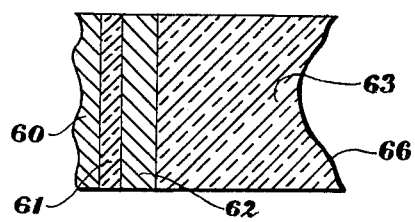
Figure 12:
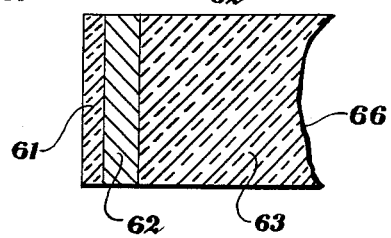

After the resin has polymerized and hardened, the prism 10 is removed leaving the plastic 63 with the aluminum layer 62 and the silicon monoxide layer 61. Some of the silver layer 60 may adhere to the silicon monoxide layer 61 as shown in Fig. 11. However, it may strip clean. If it does adhere, the residual silver is removed by an acid rinse leaving the finished product as shown in Fig. 12.

I claim:

1. The method of manufacturing a multireflector corresponding to a precise rigid prism which comprises coating said prism with a thin separable layer, holding the coated prism inside a flexible mold with each of the surfaces of the prism which correspond to a reflecting surface parallel to an inner surface of the mold and spaced perpendicularly therefrom a substantially uniform distance between .05 and .5 inch, filling the space between the prism and the mold with a liquid potting compound which polymerizes to a rigid plastic and, after polymerization, removing the prism from the rigid plastic.

2. The method according to claim 1, including the additional step of removing from the rigid plastic any residual separable layer adhering thereto.

3. The method according to claim 1 including the additional step of removing the flexible mold from the rigid plastic.

4. The method according to claim 1, including the following additional steps after the coating of the prism with a separable layer: coating the separable layer with a protective layer selected from the group consisting of silicon monoxide and magnesium fluoride, coating the protective layer with aluminum thick enough to be over 90% reflecting and then proceeding with said molding and subsequent steps whereby after said prism is finally removed, said rigid plastic has a coating of aluminum and the protective layer.

References Cited in the file of this patent
UNITED STATES PATENTS

| | | |
|---|---|---|
| 2,154,639 | Rohm et al. | Apr. 18, 1939 |
| 2,218,260 | Forbes | Oct. 15, 1940 |
| 2,379,790 | Dimmick | July 3, 1945 |
| 2,406,361 | Fairbank et al. | Aug. 27, 1946 |
| 2,409,958 | Rogers et al. | Oct. 22, 1946 |
| 2,422,954 | Dimmick | June 24, 1947 |
| 2,464,738 | White et al. | Mar. 15, 1949 |
| 2,479,935 | Johnson | Aug. 23, 1949 |
| 2,568,274 | Clark | Sept. 18, 1951 |